US011331566B2

(12) United States Patent
Miki et al.

(10) Patent No.: US 11,331,566 B2
(45) Date of Patent: May 17, 2022

(54) GAME MACHINE WITH DANCE STAGE ADAPTIVE TO TANDEM PLAYERS

(71) Applicant: KONAMI AMUSEMENT CO., LTD., Ichinomiya (JP)

(72) Inventors: Toru Miki, Ichinomiya (JP); Masahiro Kiyomoto, Ichinomiya (JP); Rei Takano, Ichinomiya (JP); Atsushi Usami, Ichinomiya (JP)

(73) Assignee: KONAMI AMUSEMENT CO., LTD., Ichinomiya (JP)

( * ) Notice: Subject to any disclaimer, the term of this patent is extended or adjusted under 35 U.S.C. 154(b) by 98 days.

(21) Appl. No.: 16/718,900

(22) Filed: Dec. 18, 2019

(65) Prior Publication Data

US 2020/0122024 A1    Apr. 23, 2020

Related U.S. Application Data

(63) Continuation of application No. PCT/JP2018/020572, filed on May 29, 2018.

(30) Foreign Application Priority Data

Jun. 20, 2017    (JP) .............................. JP2017-120488

(51) Int. Cl.
*A63F 13/213*    (2014.01)
*A63F 13/30*    (2014.01)
(Continued)

(52) U.S. Cl.
CPC ............ *A63F 13/213* (2014.09); *A63F 13/30* (2014.09); *A63F 13/798* (2014.09); *A63F 13/80* (2014.09);
(Continued)

(58) Field of Classification Search
CPC ........ G06F 3/011; G06F 3/017; G06F 3/0488; G07F 17/32; G07F 17/3204;
(Continued)

(56) References Cited

U.S. PATENT DOCUMENTS

2013/0288760 A1* 10/2013 Chiwata .............. A63F 13/5375
463/7

FOREIGN PATENT DOCUMENTS

CN    1243020 A    2/2000
JP    2000-37490 A    2/2000
(Continued)

OTHER PUBLICATIONS

Communication dated Apr. 1, 2020 by the State Intellectual Property Office of P.R. of China in application No. 201880004026.X.
(Continued)

*Primary Examiner* — Lawrence S Galka
(74) *Attorney, Agent, or Firm* — Sughrue Mion, PLLC

(57) ABSTRACT

The present invention provides a game machine provided with a stage which has a treading surface on which a plurality of play regions are set so as to be displaced from each other in a front and rear direction, that is a direction facing a display device, and are set as ranges where at least one player should perform dance steps on each range, and a step command device which commands the player step positions at which the player should tread in each of the play regions, with the step positions being changed in association with progress of a game, and being commanded through the display device in a distinguished manner for each of the play regions.

7 Claims, 14 Drawing Sheets

(51) Int. Cl.
*A63F 13/798* (2014.01)
*A63F 13/80* (2014.01)
*A63F 13/90* (2014.01)
*A63F 13/843* (2014.01)

(52) U.S. Cl.
CPC ............ *A63F 13/90* (2014.09); *A63F 13/843* (2014.09); *A63F 2300/1025* (2013.01); *A63F 2300/1043* (2013.01); *A63F 2300/1087* (2013.01); *A63F 2300/558* (2013.01); *A63F 2300/8088* (2013.01); *A63F 2300/8094* (2013.01)

(58) Field of Classification Search
CPC ............ G07F 17/3209; G07F 17/3216; G07F 17/3276; G10H 2220/145
See application file for complete search history.

(56) References Cited

FOREIGN PATENT DOCUMENTS

| | | |
|---|---|---|
| JP | 2002-166051 A | 6/2002 |
| JP | 2005-143714 A | 6/2005 |
| JP | 2008-168143 A | 7/2008 |
| JP | 2015-58127 A | 3/2015 |
| JP | 2016-49252 A | 4/2016 |

OTHER PUBLICATIONS

International Search Report dated Aug. 21, 2018 from International Searching Authority in International Application No. PCT/JP2018/020572.
Written Opinion dated Aug. 21, 2018 from International Searching Authority in International Application No. PCT/JP2018/020572.
Notice of Reasons for Refusal dated Aug. 7, 2018 from the Japanese Patent Office in Application No. 2017-120488.
Notice of Reasons for Refusal dated Jan. 20, 2020 from the Japanese Patent Office in Application No. 2019-087604.
Office Action dated Jul. 16, 2021 by the Korean Patent Office in Korean Application No. 10-2019-7037602.

* cited by examiner

GAME MACHINE WITH DANCE STAGE ADAPTIVE TO TANDEM PLAYERS

TECHNICAL FIELD

The present invention relates to a game machine with a dance theme.

BACKGROUND ART

As a game machine configured so that a player takes dance steps according to music, there is known a game machine which has a stage on which at least two players can mount. In that game machine, a plurality of input portions capable of detecting stepping actions of each of the players are arranged in front, back, left and right directions, positions of the input portions to be stepped by each player are sequentially instructed in accordance with progress of the music to be played in the game, and the steps by each player are evaluated by comparing detected results of the stepping actions of each player with the instructions to the players (see, for example, PTL 1).

CITATION LIST

Patent Literature

PTL1: Japanese Laid-Open Patent Publication 2000-037490.

SUMMARY OF INVENTION

Technical Problem

In a conventional game machine, on the assumption that a plurality of players play simultaneously, a plurality of play regions are arranged side by side in the left and right direction of the game machine, an input unit is provided for each play region, and commands for the dance action to the players are provided in a distinguished manner for each play region. That is, the conventional game machine is configured to take a dance step in a state where a plurality of players are arranged side by side. However, in a real dance, there are many cases where the dancers are lined in the front and rear direction to show complex performances by taking steps in a cooperated or collaborated manner. The conventional game machines are difficult to produce such type of performance, and there is room for further consideration in terms of rendition to show the dance to others.

Accordingly, an object of the present invention is to provide a game machine that are capable of enhancing an interest of a game by guiding a player so as to take steps with a high performance.

Solution to Technical Problem

In one aspect according to the present invention, there is provided a game machine provided with: a stage having a treading surface on which a plurality of play regions are set so as to be displaced from each other in a front and rear direction that is a direction facing a display device, and each set as a range where at least one player should perform steps of a dance; and a step command device which commands the player step positions at which the player should tread in each of the play regions, with the step positions being changed in association with progress of a game, and being commanded through the display device in a distinguished manner for each of the play regions.

DESCRIPTION OF EMBODIMENTS

Figure 1:
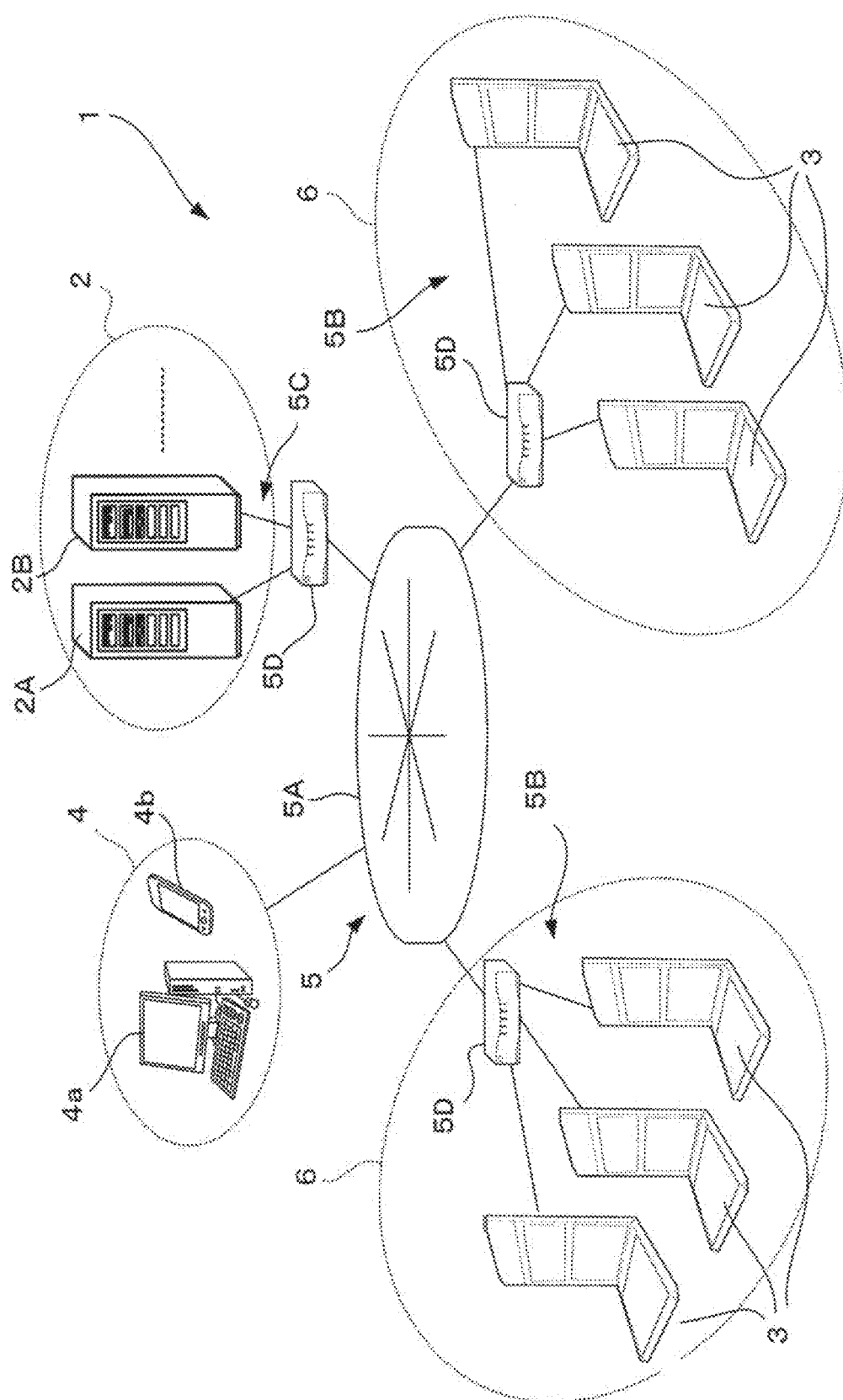
FIG. 1 is a figure showing an example of a game system including a game machine according to an embodiment of the present invention.

An example of a game system that includes a game machine according to an embodiment of the present invention will now be explained. First, the overall structure of the game system will be explained with reference to FIG. 1. The game system 1 includes a center server 2 that serves as a server device, and a plurality of game machines 3 and a plurality of user terminal devices 4 that serve as client devices and that can be connected to the center server 2 via a predetermined network 5. The term "user" is a generic term for a person who utilizes the game system 1, and sometimes a user who plays a game on a game machine 3 may herein be termed a "player". The center server 2 is built as a single logical server device by combining server units 2A, 2B that function as a plurality of computer devices. However, it would also be possible for the center server 2 to be built as a single server unit. Alternatively, the center server 2 may also be built logically by employing cloud computing.

Each of the game machines 3 is built as a commercial game machine (for business use) that, in exchange for payment of a predetermined playing fee, allows users to play a game within a range that corresponds to that playing fee. This type of game machine 3 is sometimes called an arcade game machine. The game machine 3 is a computer device that is installed in a predetermined facility such as a shop 6 or the like, with the primary objecting of increasing profits by enabling a large number of users to play a game repeatedly. The game machine 3 is built as a dance game machine for playing a dance game in which the player is commanded to perform actions of various types that constitute a dance, for example steps that are to be enacted in a predetermined sequence in time to music, and the actions that the player has actually performed in response to those commands are evaluated. A dance game is a type of music game in which various actions (steps and so on) that constitute a dance and that match the rhythm of music are requested as play actions.

Each of the user terminal devices 4 is a computer device that can be connected to the network and that is applied to personal use by a user. For example, a desktop type or notebook type personal computer 4a (hereinafter referred to as a "PC") or a mobile terminal device such as a portable telephone (including a smart phone) may be employed as a user terminal device 4. Apart from the above, computer devices of various types that can be connected to the network and that are applied to personal use, such as desktop type game machines for household use, portable type game machines, or portable type tablet terminal devices, may also be employed as user terminal devices 4. By software of various types being implemented, a user terminal device 4 can enable the user to enjoy services of various types supplied by the center server 2.

The network 5 may have any appropriate structure, provided that it is capable of connecting the game machines 3 and the user terminal devices 4 to the center server 2. For example, the network 5 may be implemented to perform network communication by employing the TCP/IP protocol. Typically, the network is built up by the internet 5A that serves as a WAN and LANs 5B and 5C that connect the center server 2 and each of various game machines 3 to the internet 5A being connected via routers 5D. The user terminal devices 4 are also connected to the internet 5A by appropriate equipment. It would also be possible for a local server to be installed between one or more game machines 3 and a router 5D of a shop 6, so that the game machines 3 are connected so as to be capable of communication with the center server 2 via this local server. In some cases, the server units 2A, 2B, . . . of the center server 2 may be connected to one another by the WAN 5A, instead of or as well as by the LAN 5C.

Figure 2:
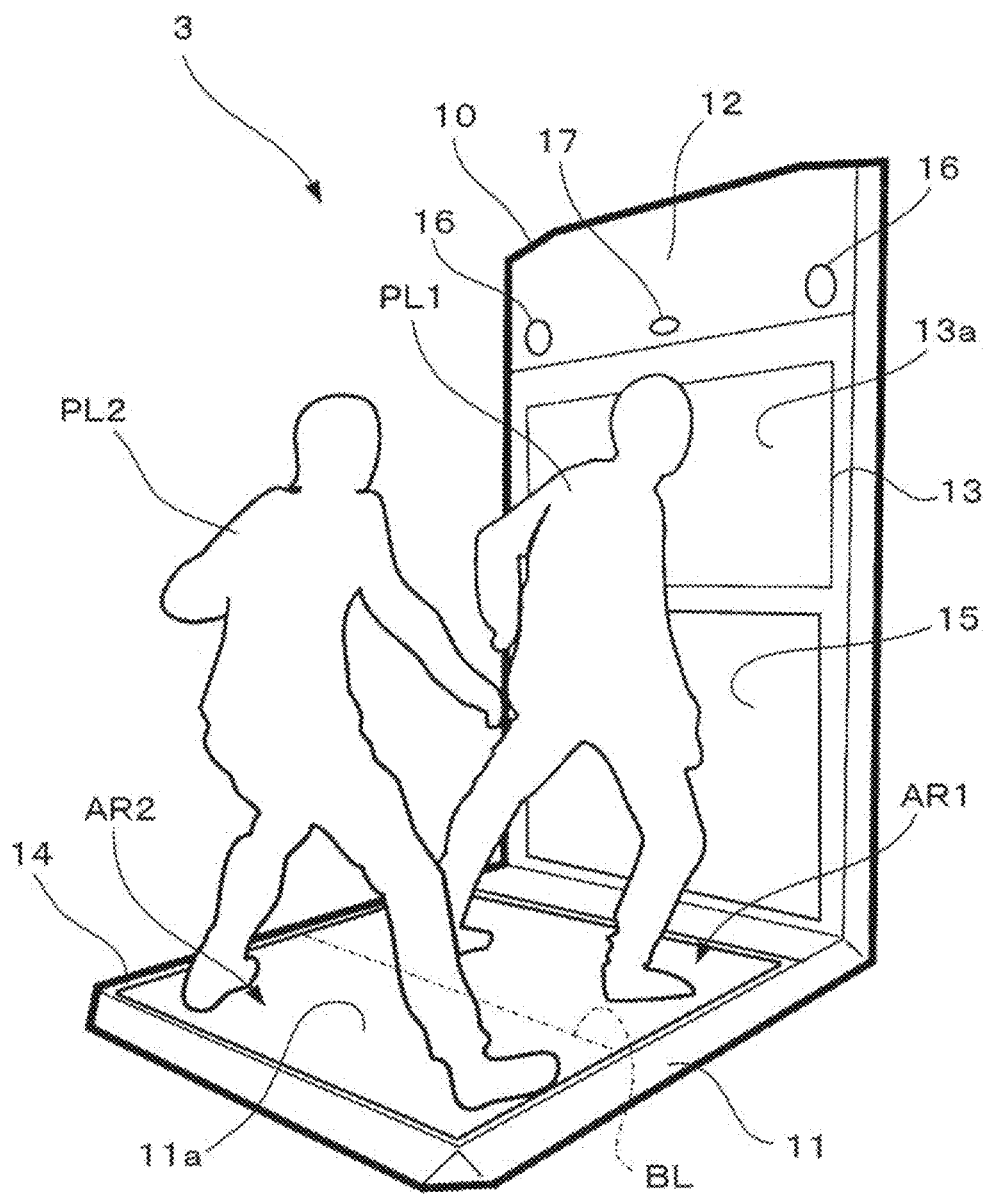
FIG. 2 is a figure showing the structure of the game machine.

Next, the structure of one of the game machines 3 will be explained with reference to FIGS. 2 and 3. FIG. 2 shows an example of a single game machine 3. The game machine 3 of the shown example has a casing 10. The casing 10 is built to have an overall external shape approximately in the form of a letter L, and includes a stage 11 that is installed upon a horizontal surface where the game machine 3 is to be set up, such as the surface of a floor in a facility such as a shop 6 or the like, and a standing wall 12 that extends generally vertically from the end portion of the stage 11. A display device 13 is mounted upon the front upper portion of the standing wall 12 so that its display surface 13a faces toward the stage 11. As one example, the display device 13 may be a flat panel display such as a liquid crystal display or the like. The direction of the display device 13 orthogonal to the display surface 13a is the longitudinal (front and rear) direction of the game machine 3, the direction in a horizontal plane orthogonal to this longitudinal direction is the transverse (left and right) direction of the game machine 3, and the direction orthogonal to both this longitudinal direction and this transverse direction is the vertical direction of the game machine 3. However, in relation to the front, rear, left, and right of the game machine 3, it will be supposed that the front side, the rear side, the right side, and the left side are defined by taking as reference the state in which the game machine 3 is viewed facing the display surface 13a. For example, the side facing toward the display surface 13a is the front side, and the side away from the display surface 13a is the rear side.

As one example, the stage 11 may be formed in the shape of a flat plate that is generally rectangular, with its longitudinal direction being the longer. The upper surface of the stage 11 is built as a treading surface 11a that is of a size sufficient for it to be possible for two players PL1, PL2 (sometimes represented by "PL") to tread out dance steps while being lined up along the longitudinal direction of the game machine 3. Corresponding to the arrangement in which the two players PL are lined up in the longitudinal direction, two play regions AR1, AR2 (sometimes represented by "AR") are set on the treading surface 11a of the stage 11, so as to bisect the treading surface 11a in the longitudinal direction. In FIG. 2, the position of the boundary between the play regions AR1, AR2 is shown by a single dotted chain line BL.

As one example, each of the play regions AR is set as a range in which one of the players PL treads out dance steps. The two play regions AR are of the same shape and size. The size of each of the play regions AR may be set as appropriate according to the age group, range of physique, and so on of the player PL who is assumed to be the subject of the dance game. As one example, in the case of providing a dance game for which an adult player PL is taken to be the subject, if the dance game is set up so that a player PL in one of the play regions AR executes steps by changing his/her position in the transverse direction, and change of his/her stepping position in the longitudinal direction is not considered, then the size of each of the play regions AR may be set to be approximately 0.5 m or more in the longitudinal direction. In this case, in relation to the size in the transverse direction, this may be set as appropriate, according to how much the stepping position changes. On the other hand, when setting up a game machine 3 for which a child is considered to be the subject, the play region AR may be set to be smaller than the range described above. However, the sizes of the play regions AR are not limited to the above examples; they may be built of appropriate sizes, according to what type of player PL the dance game is targeting and what type of dance moves will be demanded from the player PL. Furthermore, a stage sensor 14 is provided to the stage 11 as an example of a step detection device that outputs a signal according to the actual step position, which is the position where the player PL is actually treading on its treading surface 11a. The stage sensor 14 will be described hereinafter.

The display surface 13a of the display device 13 may be disposed at the same level as the line of sight of a player PL who is standing upon the treading surface 11a and is looking horizontally forward. The height of the line of sight of the player PL changes according to the age group and the physical structure of the player PL, but here it will suffice if the height of the display surface 13a is set so that a player PL of the age group targeted by the dance game is easily capable of viewing an image upon the display surface 13a.

A mirror 15 is attached to the standing wall 12 of the casing 10 so as to be positioned below the display device 13. The mirror 15 is arranged so as to face the chest portion of a player PL who is standing facing the display surface 13a, or a portion lower than his abdomen. Accordingly, a player PL1 who is positioned upon the play region AR1 at the front side of the stage 11 is able, using the mirror 15, visually to check what type of steps the player PL2 who is positioned upon the play region at the rear side is executing.

Furthermore, a speaker device 16 for replaying dance music and sound effects of games and so on and a camera 17 for photographing a player PL upon the treading surface 11a of the stage 11 are provided upon the standing wall 12 of the casing 10. The camera 17 is capable of video photography, and serves as an example of a dance video acquisition device that acquires dance video images during the game in which the postures of the player PL who is dancing are photographed. The camera 17 is disposed above the display device 13 and at its approximate center in the transverse direction, so as to photograph the player PL slantingly from in front and above. It would also be possible to attach a plurality of cameras 17 to the standing wall 12, in order to photograph the player PL from a plurality of points of view. Alternatively, a frame-like structure may be provided around the stage 11, and a camera 17 maybe provided upon that structure for photographing the player PL from the side or from the rear.

Figure 3:
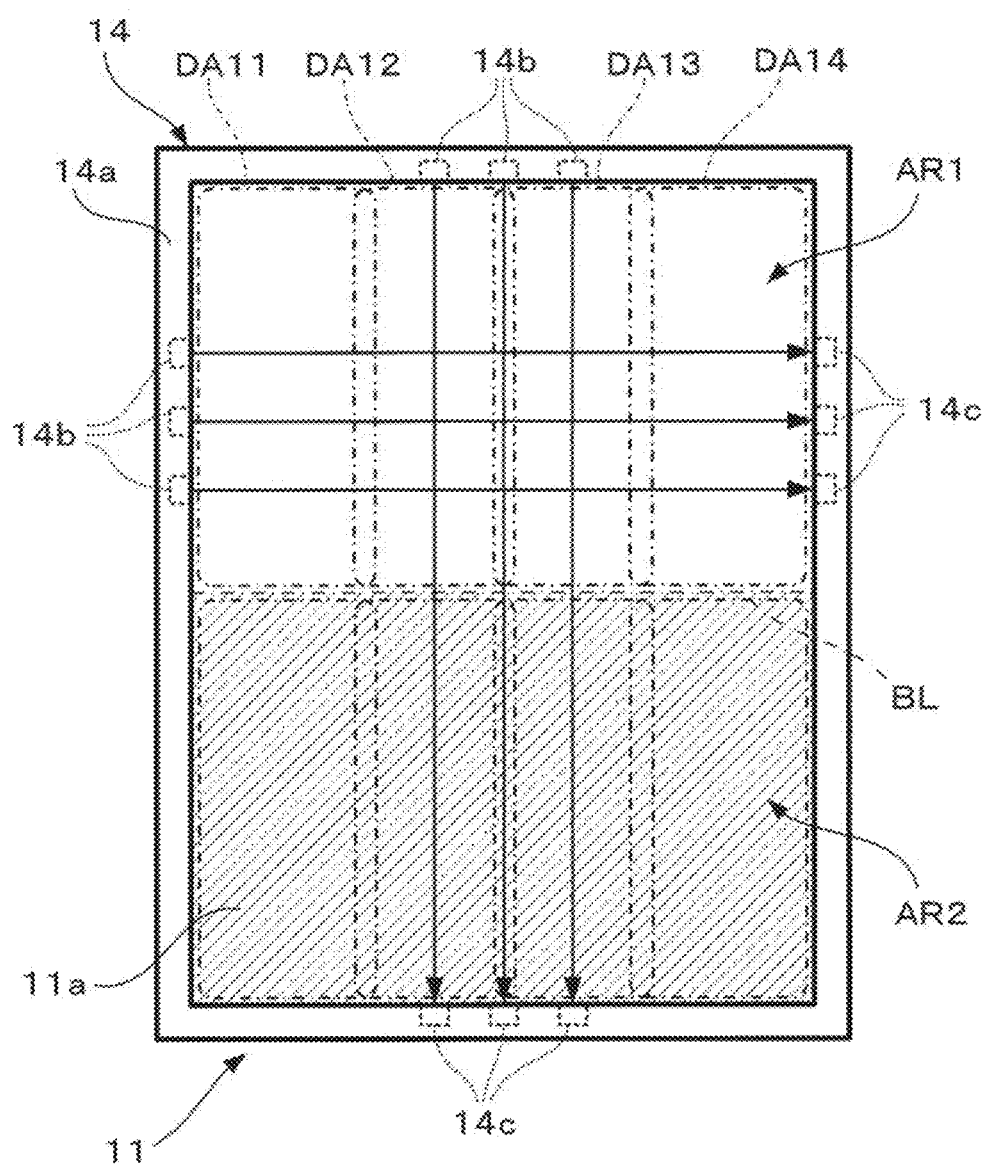
FIG. 3 is a figure showing a stage sensor.

FIG. 3 shows an example of the stage sensor 14. The stage sensor has a frame 14a that is rectangular in shape and that surrounds the periphery of the treading surface 11a of the stage 11. A plurality of light emission portions 14b that emit infrared light serving as an example of scanning light which is focused into the form of beams, are provided at a predetermined pitch (spacing interval) along one long side (the left side in FIG. 3) and along one short side (the upper side in FIG. 3) of the frame 14a, and light reception portions 14c which receive the infrared light emitted from the corresponding light emission portions 14b are provided at the same pitch as the light emission portions 14b, along the other long side and the other short side. In FIG. 3, only some of the light emission portions 14b and the light reception portions 14c are shown, but actually the light emission portions 14b and the light reception portions 14c are provided at a constant pitch from one end of the long side direction of the frame 14a to the other end, and from one end of the short side direction thereof to the other end. The direction of emission of infrared light from the light emission portions 14b that are provided upon the long edge of the frame 14a is parallel to the short side direction of the frame 14a, and the infrared light beams from those light emission portions 14b are incident upon the light reception portions 14c that oppose them along the short side direction. Moreover, the direction of emission of infrared light from the light emission portions 14b that are provided upon the short edge of the frame 14a is parallel to the long side direction of the frame 14a, and the infrared light beams from those light emission portions 14b are incident upon the light reception portions 14c that oppose them along the long side direction. Accordingly, the space above the treading surface 11a of the stage 11 is scanned vertically and horizontally by infrared light beams in a grid pattern.

The light reception portions 14c output different signals, depending upon whether or not they detect infrared light. As one example, the light reception portions 14c may output ON signals when they detect infrared light, and may output OFF signals when they do not detect infrared light. When a player PL steps in any position upon the treading surface 11a, incidence of infrared light upon some of the light reception portions 14c is impeded due to the foot of this player PL. Accordingly, it is possible to detect in which position the player PL is stepping upon the treading surface 11a by determining which of the output signals from the light reception portions 14c are ON and which are OFF. Incidentally, the pitches of the light emission portions 14b and of the light reception portions 14c may be set as appropriate, according to the resolving power related to detection of the positions of the feet of the player PL, in other words according to the accuracy with which it is necessary to detect the position of his/her feet. The pitch of the light emission portions 14b and the light reception portions 14c along the long side direction of the frame 14a and the pitch of the light emission portions 14b and the light reception portions 14c along the short side direction of the frame 14a may be the same, or may be different.

As described above, the two play regions AR1, AR2 that sandwich the boundary line BL are set upon the treading surface 11a of the stage 11 so as to bisect the stage 11 in the longitudinal direction (the vertical direction in FIG. 3). In FIG. 3, the play region AR2 at the rear side of the stage 11 is shown by hatching. Furthermore, in each of the play regions AR, a plurality of determination regions DA (four in the example shown in the figure) are set at positions spaced apart in the transverse direction. Accordingly, a total of eight determination regions DA are set upon the treading surface 11a. In FIG. 3 the determination regions DA in the play region AR1 at the front side are distinguished from one another by the reference symbols DA11, DA12, DA13, and DA14 being appended to them in order from the left, and the determination regions DA in the play region AR2 at the rear side are distinguished from one another by the reference symbols DA21, DA22, DA23, and DA24 being appended to them in order from the left, but, if they are not to be distinguished from one another, then they will be referred to as "determination regions DA". The determination regions DA are regions that are units for commanding the player PL where to tread, and moreover are regions that are units for determining whether or not his/her actual step position is appropriate. In other words, a command is issued by the game machine 3 to the player PL for ordering him/her to tread upon the treading surface 11a in anyone of the determination regions DA, and it is determined whether or not the player PL has executed treading in an appropriate manner in response to the command, by detecting whether or not operation by the player to tread in the determination region DA that was commanded has been performed.

Unique sensor numbers are assigned to each of the light reception portions 14c, and data for associating the sensor numbers with the determination regions DA is provided to the control unit 20 in advance. Accordingly, by acquiring the sensor numbers of the light reception portions 14c that are outputting OFF signals, the control unit 20 is able to determine to which of the determination regions DA the position where the player PL is treading upon the treading surface 11a belongs. It would be possible for the external boundaries of the determination regions DA to be set so as mutually to overlap one another, or for their external boundaries to be set so that they touch one another. Alternatively, some gaps might be set between the determination regions DA. Furthermore, it is not necessary to provide an arrangement of the light emission portions 14b such that, in each of the play regions AR1, AR2, infrared light passes through only one signal determination region DA. In a case in which overlapping of the determination regions DA with one another is allowed, it would be possible to provide an arrangement of some of the light emission portions 14b such that infrared light passes through such overlapped portions. A foot of a player PL that is to be a subject of detection has a certain size, and, when the player PL is commanded to tread in any one of the determination regions DA, it is rather harsh to demand exact treading such that the foot of the player does not enter into any determination region DA other than the determination region DA that has thus been commanded. Due to this, with this game machine 3, it is decided that treading according to the command has been performed, provided that treading in the determination region DA that has been commanded is detected. Accordingly, overlapping of parts of the determination regions DA, and arrangement of the light emission portions 14b such that their infrared beams pass through these overlapped portions, are both permitted.

The play regions AR, AR2 and the determination regions DA may be explicitly visually distinguished upon the treading surface 11a so that the players PL can recognize them by sight, or may not be explicitly shown in this manner. As the scanning light, the stage sensor 14 may employ light in a wavelength region other than infrared light, for example visible light.

Figure 4:
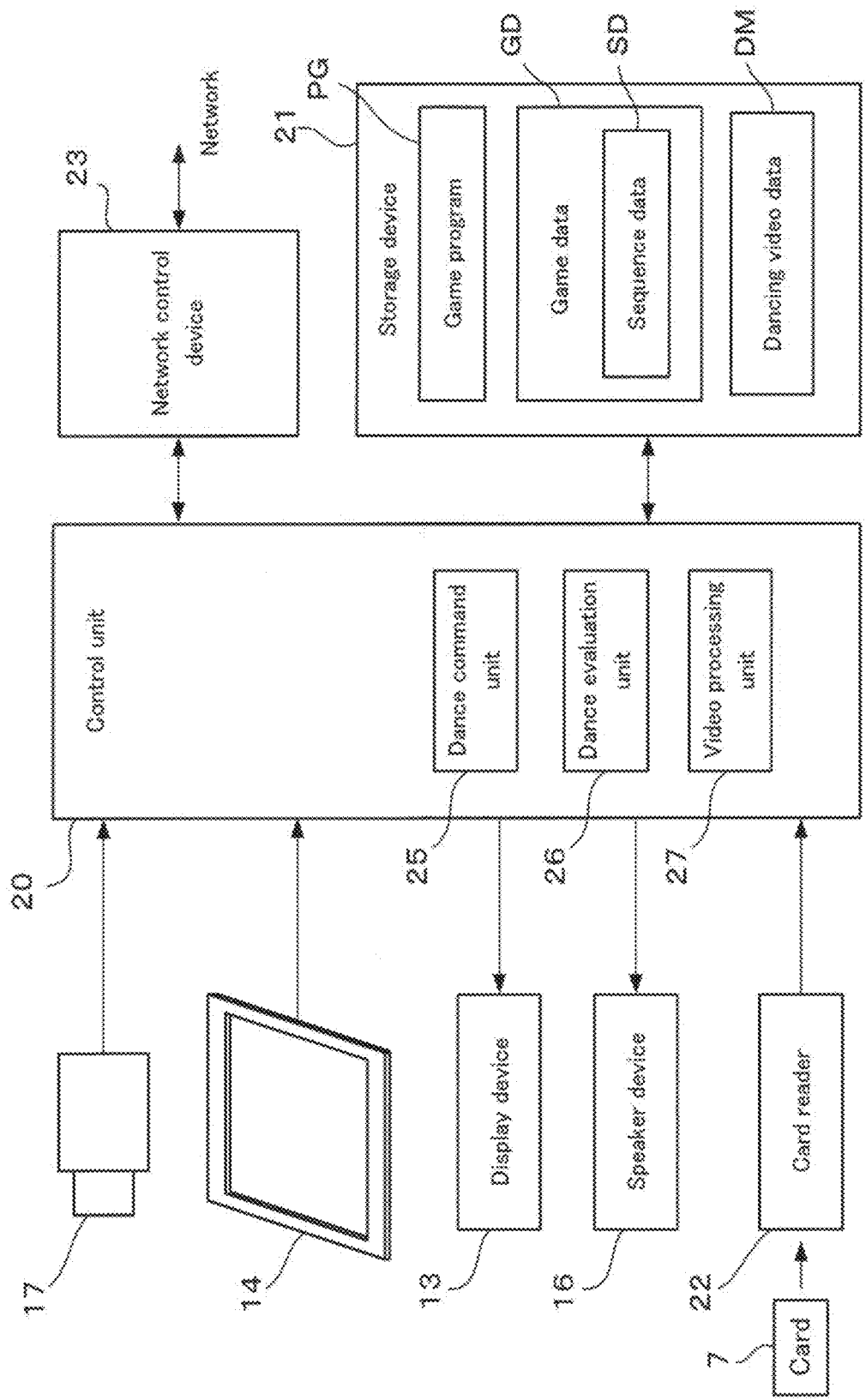
FIG. 4 is a functional block diagram showing principal portions of a control system of the game machine.

Next, the structure of the control system of the game machine 3 will be explained with reference to FIGS. 4 and 5. FIG. 4 shows the structure of principal portions of the control system of the game machine 3. The game machine 3 is provided with a control unit 20 and a storage device 21 (i.e. a storage means). The control unit 20 is built as a computer in which a microprocessor and internal storage devices (such as ROM and RAM) and so on that are required for the operation of that microprocessor are combined. The storage device 21 is a non-volatile storage device that is capable of maintaining storage, such as for example a hard disk storage device or a flash memory. The storage device 21 stores a game program PG that is executed by the control unit 20 and game data GD needed by that program PG for reference.

The game program PG is an application program that runs on the operating system of the game machine 3 for causing the game machine 3 to function as a dance game machine on which it is possible to play a predetermined dance game. The game data GD includes data of various types such as image data that is required for drawing game screens according to the game program PG, musical piece data that is required for replaying musical pieces upon which dance games are based, and so on. And the game data GD includes sequence data SD. The sequence data SD is data in which, for each musical piece, actions are described such as a series of steps and so on that are to be commanded to the players, matched to the musical piece that is to be replayed during the game. The contents of the sequence data SD will be described hereinafter. Furthermore, dancing video data DM is also stored in the storage device 21, according to requirements. Such dancing video data DM is video data in which dancing video imagery of a player that has been photographed by the camera 17 during play of the dance game is stored in a predetermined format.

In addition to the stage sensor 14 and the camera 17 shown in FIG. 2, also a card reader 22 is provided to the game machine 3 as an input device for the control unit 20. The card reader 22 reads in predetermined information from a card 7 that the user possesses, and supplies this information to the control unit 20. The card 7 includes a storage medium upon which is recorded a card ID that is unique for each card. The card ID is employed, for example, as identification information when, on the center server 2, recorded play data such as history of games played by the user upon the game machine 3 and so on, is stored, or when play data is being acquired from the center server 2 to the game machine 3. Furthermore, the display device 13 and the speaker device 16 shown in FIG. 2 are provided to the game machine 3 as output devices for the control unit 20. Yet further, a network control device 23 is connected to the control unit 20. The network control device 23 is a communication control unit that connects the control unit 20 to the network 5, and that controls processing required for establishing a communication procedure when communicating with the center server 2 or with another game machine 3, and for transmission and reception of data.

As logical devices that are implemented by a combination of hardware resources of the control unit 20 and the game program PG that serves as software, the control unit 20 includes a dance command unit 25, a dance evaluation unit 26, and a video processing unit 27. On the basis of the sequence data SD, the dance command unit 25 displays on the display surface 13a of the display device 13 guidance images commanding a series of dance actions that are to be performed during the dance game by the players PL1, PL2 respectively. The dance command unit 25 commands dance actions by the players PL on the basis of the sequence data SD while distinguishing between the play regions AR1, AR2. Commands for positions where the players PL should tread upon the treading surface 11a (i.e. step positions) during the dance game are included in the commands issued by the dance command unit 25. The positions that are indicated change as appropriate within each of the play regions AR according to the progression of the musical piece, and the step positions for the players PL are commanded while distinguishing between each of the play regions AR. Therefore, the dance command unit 25 serves as an example of a step command device. The dance evaluation unit 26 functions as one example of an evaluation device that evaluates the players PL on the basis of comparison between the pattern in which the step positions are commanded by the dance command unit 25 and the pattern in which the actual step positions are detected by the stage sensor 14. As one example, the dance evaluation unit 26 performs evaluation on the basis of comparison between the time points and the determination regions according to which a series of actions in the dance are described in the sequence data SD, and the results of detection by the stage sensor 14 of the time points and the positions of the actual dance actions. The evaluation technique will be described hereinafter.

The video processing unit 27 stores dancing video imagery acquired by the camera 1 during play of the game in the storage device 21 as appropriate, or transmits it to the network 5 via the network control device 23 as appropriate. Therefore, the video processing unit 27 serves as one example of a video transmission device. The recipient of such dancing video imagery may be selected as appropriate from the center server 2, the other game machines 3, and the user terminal devices 4. By the dancing video imagery being immediately distributed to a game machine 3 or to a user terminal device 4, or being distributed at some appropriate timing, it is possible for the users of the game system 1 to view dancing video imagery relating to other people. Alternatively, the user is also able to check his/her own dancing video imagery via a user terminal device 4 or the like.

Figure 5:
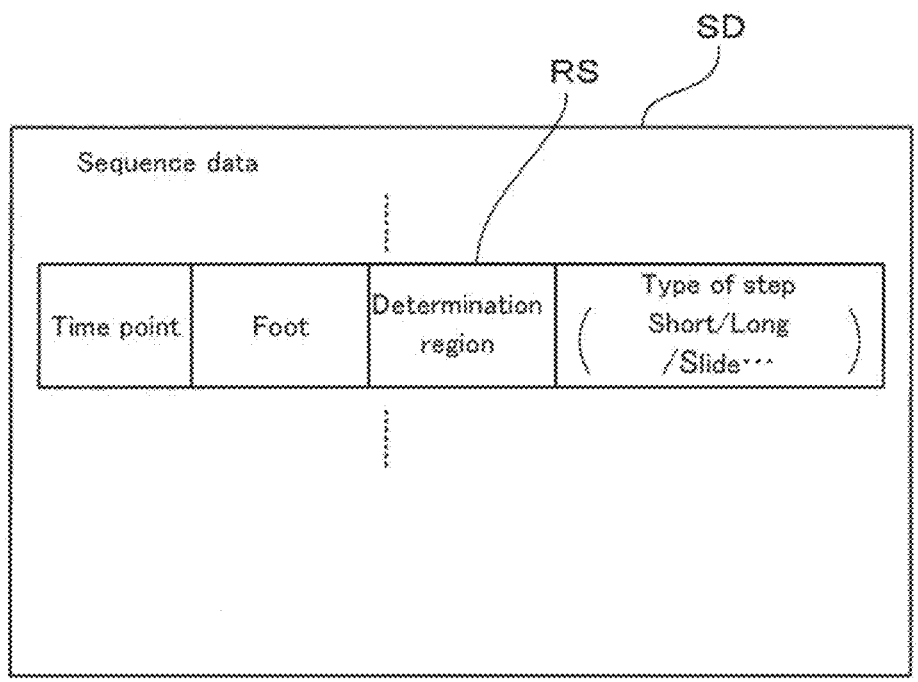
FIG. 5 is a figure showing an example of a structure of sequence data.

FIG. 5 shows an example of the structure of the sequence data SD. The sequence data SD is a set of records in which are described actions such as steps or the like that are to be performed by the player or players PL during play of the dance game. The sequence data SD includes a step record RS that specifies the steps to be performed by the player PL during play. Information specifying the time point at which each step should be performed, information specifying with which foot the player PL should perform the step, information specifying the determination region DA in which the step should be performed, and information specifying the type of the step are recorded in this step record RS in mutual association with one another. The time point information may, as one example, be information that specifies the elapsed time from the start of replay of the musical piece that is being reproduced in the dance game, or information that specifies the position in the musical piece. The information specifying the foot is information that specifies with which one of the right foot and the left foot the player PL is to perform the step. And the information for the determination region DA is information specifying one of the eight determination regions DA shown in FIG. 3.

Moreover, the information for specifying the type of step is information that specifies the step that the player PL must perform, from among steps of a plurality of types. Examples of step types include a short step in which the player takes one step, a long step in which he/she keeps his/her foot stationary in a predetermined position for a predetermined time duration, and a slide in which he/she moves his/her foot between a plurality of determination regions DA. The details will be described hereinafter. In the step record RS that corresponds to a long step, the time point at which the step should start and the time point at which the step should end are specified. And, in the step record RS that corresponds to a slide, along with the time point at which the step should start and the time point at which it should end being specified, also the determination region DA in which the slide should start and the determination region DA in which the slide should end are specified.

Figure 6:
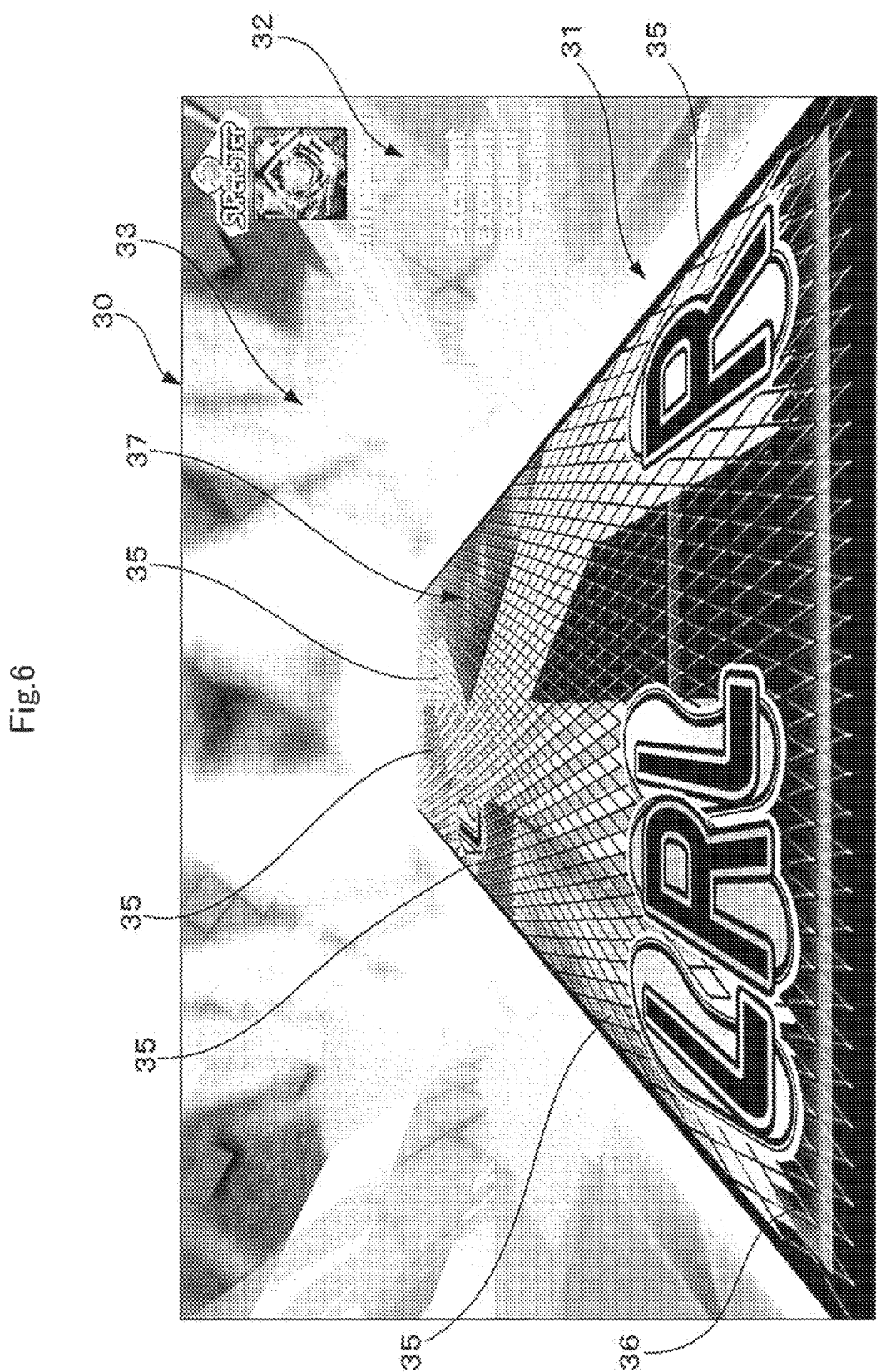
FIG. 6 is a figure showing an example of a game screen including guidance images that are displayed on the basis of sequence data.

During game play, the dance command unit 25 shown in FIG. 4 sequentially reads in records included in the sequence data 25, and, on a predetermined cycle (for example at the frame rate of the display device 13), repeatedly generates and displays upon the display surface 13a of the display device 13 guidance images that command the player PL to perform dance actions according to those records. FIG. 6 shows an example of a game screen that includes a guidance image generated by the dance command unit 25. The game screen 30 of FIG. 6 includes a guidance image 31 that is generated on the basis of the sequence data SD, an information image 32 that shows evaluation of the player PL and so on, and a background image 33 that renders the game. The guidance image 31 includes command marks 35 that command steps and so on described in the records of the sequence data SD, and a reference mark 36 that indicates the present time point in the game. The reference mark 36 is displayed as a band shaped image that extends in the transverse direction of the guidance image 31. The guidance image 31 issues a command to the player PL at the time point when he/she is to perform the action such as a step or the like, by the command marks 35 being shifted gradually within a predetermined shifting region 37 toward the reference mark 36 along with the progression of the musical piece, so that each of the command marks 35 overlaps the reference mark 36 at the time point that its corresponding action such as a step or the like is to be performed. The lengths of the command marks 35 vary according to the lengths of the time durations over which their actions should be continued. This feature is the same as the method for commanding operational timings or time points of operations in various per se known types of music games or dance games.

Figure 7:
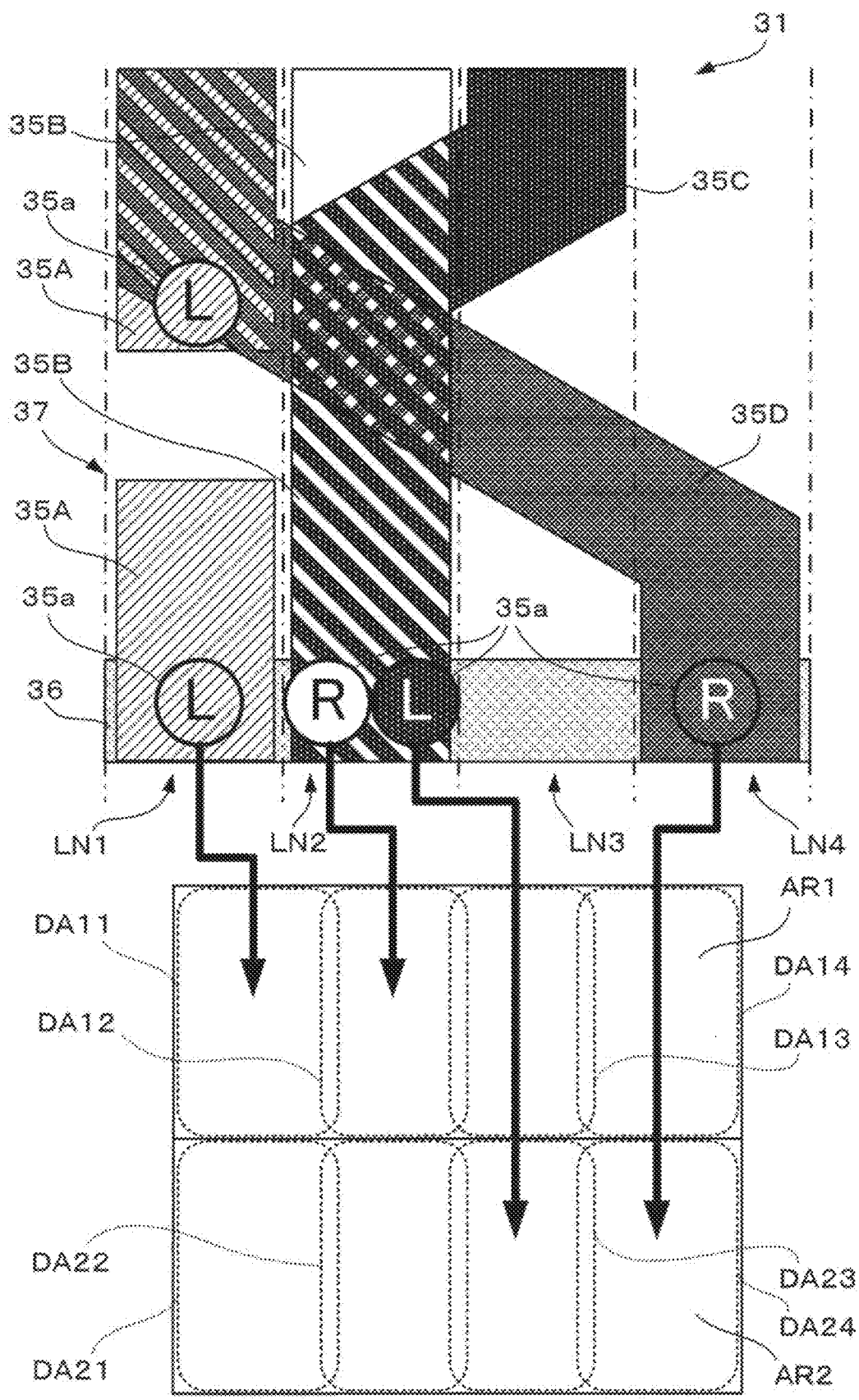
FIG. 7 is a figure showing an example of a correspondence relationship between the guidance images of FIG. 6 and determination regions that are set upon a treading surface of a stage.

In addition to indicating the time points for the actions described above and their continuous time intervals, it is also arranged for the guidance image 31 to indicate what type of step the player PL should perform in which of the determination regions DA, according to the position of the command mark 35 in the transverse direction and according to the way in which the command mark 35 is displayed. In the following, the relationship between the command mark 35 and the step that the player PL should perform will be explained in concrete terms with reference to FIGS. 7 through 10. FIG. 7 shows an example of a correspondence relationship between the guidance image 31 and the determination regions DA upon the treading surface 11a. Incidentally, in FIG. 7, the shifting region 37 is shown in the state of being developed on the drawing paper. In the guidance image 31 of FIG. 6, in order for a sense of depth to be created, the shifting region 37 is displayed in a state so as appear at an angle, so that the upper edge of the shifting region is positioned further away from the viewer and its lower edge is positioned more toward the viewer. Moreover, in FIG. 7, the command marks 35 are shown with the subscripts A through D, so as to be distinguished from one another. FIG. 7 shows the correspondence relationship between the guidance image 31 and the determination regions DA, and the dimensional relationship shown in the figure is not necessarily the same as that of the actual game machine 3. For example, the determination regions DA are shown as being displayed in a state with certain gaps open between them and the inner periphery of the stage sensor 14, but it would be possible for them to be displayed in a state in which there are no gaps, in other words to be set to a state in which the outer periphery of the determination regions DA coincides with the inner periphery of the stage sensor 14. The vertical and horizontal dimensions of the treading surface 11a may be set as appropriate.

As is clear from FIG. 7, four lanes LN1 through LN4 (sometimes the term "LN" is employed as representative) are set in the shifting region 37, respectively matched to the four determination regions DA11 through DA14 and DA21 through DA24 in the transverse direction in each of the play regions AR1, AR2. The left end lane LN1 corresponds to the left end determination regions DA11, DA21. And the other lanes LN2 through LN4 respectively correspond to the determination regions DA12 through DA14 and DA22 through DA24 in order in the transverse direction. The command marks 35 are displayed in lanes LN corresponding to the determination regions DA specified by the step records RS. However, if the type of step is a slide, then its command mark 35 is displayed so as to be gradually displaced from the lane LN corresponding to the start position of the slide to the lane LN corresponding to its end position. In the example of FIG. 7, the command marks 35C, 35D correspond to a slide.

Furthermore, the command marks 35 are displayed while being visually differentiated, so that it is possible to distinguish to which of the play regions AR1, AR2 they correspond, and whether they correspond to the left foot or to the right foot of the player PL. While in FIG. 7 the command marks 35 are distinguished by differences in hatching, it would be possible to distinguish the command marks 35 by employing various visual factors, such as color, pattern, or the like. In other words, the positions in the transverse direction of the determination regions DA in which steps should be made are commanded by the positions in the transverse direction of the command marks 35. Furthermore, in which of the play regions AR1, AR2 the determination regions DA in which the steps that should be made are located, and which of the left foot or the right foot of the player should be employed for making the step, are commanded according to the visual factors such as the color, the pattern, or the like of the command marks 35. A command mark 35 that commands a step by the left foot does not necessarily need to be positioned toward the left side of the display surface 13a with respect to a command mark 35 that commands a step by the right foot in the same play region AR. In other words, it is also permitted for command marks 35 to be displayed so that the transverse direction of the stage 11 and the left and right relationship of the feet with which steps are to be made are reversed. By appropriately mixing commands of this type, it is possible to guide the player PL so as to perform steps while turning so that his/her back faces the display surface 13a.

An identification portion 35a is attached at the lower end portion of each command mark 35 for indicating to the player PL whether he/she should perform the step with the left foot or the right foot. For example, in the case of a command to perform the step with the left foot, the letter "L" is displayed in the identification portion 35a, and, in the case of a command to perform the step with the right foot, the letter "R" is displayed. In FIG. 7, a command mark 35 in which "L" or "R" is written as a black character corresponds to the play region AR1 on the front side, while a command mark 35 in which "L" or "R" is written as a white character corresponds to the play region AR2 on the rear side.

Figure 8:
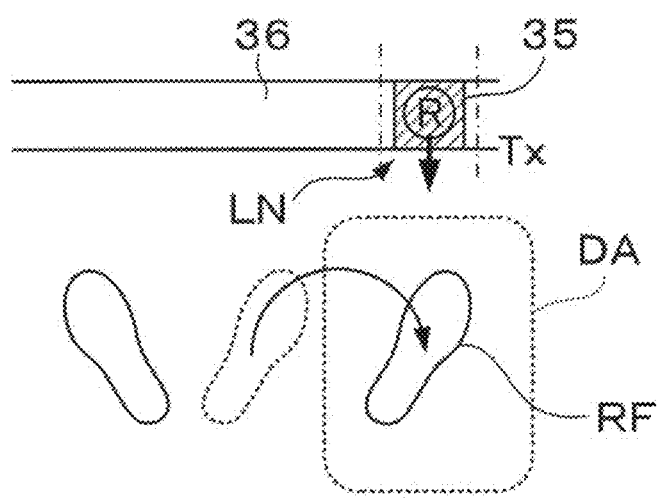
FIG. 8 is a figure showing an example of a correspondence relationship between a command mark corresponding to a short step and the step that the player should perform.
Figure 9:
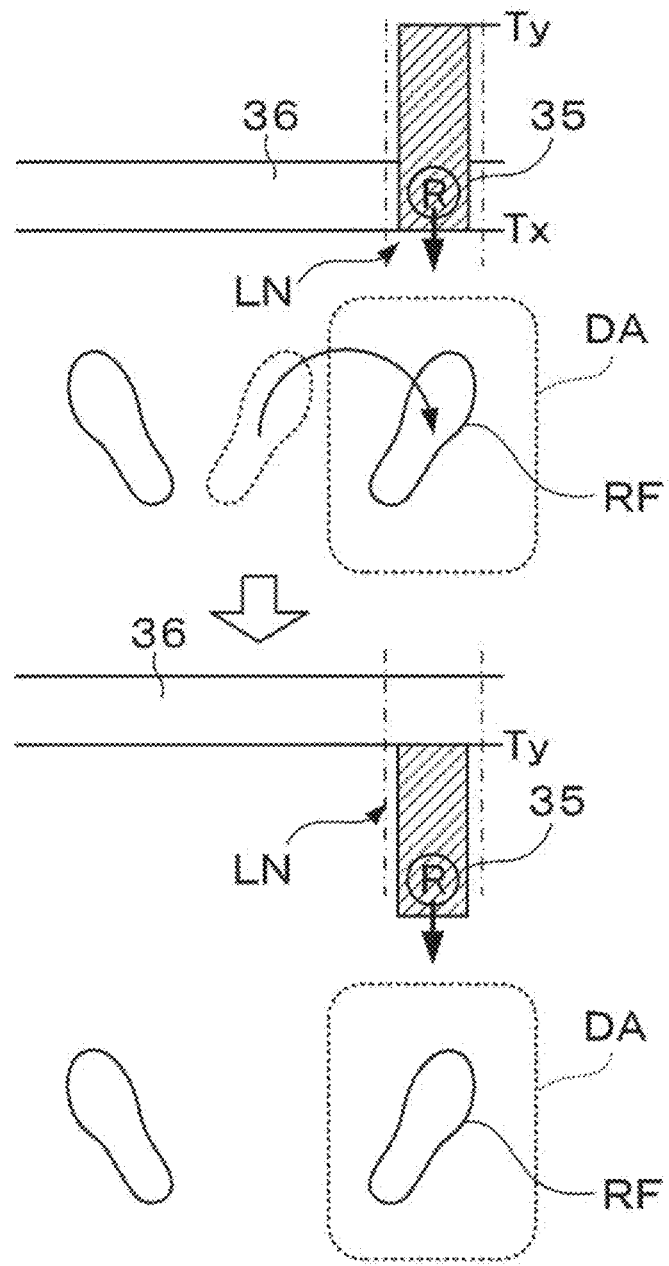
FIG. 9 is a figure showing an example of a correspondence relationship between a command mark corresponding to a long step and the step that the player should perform.
Figure 10:
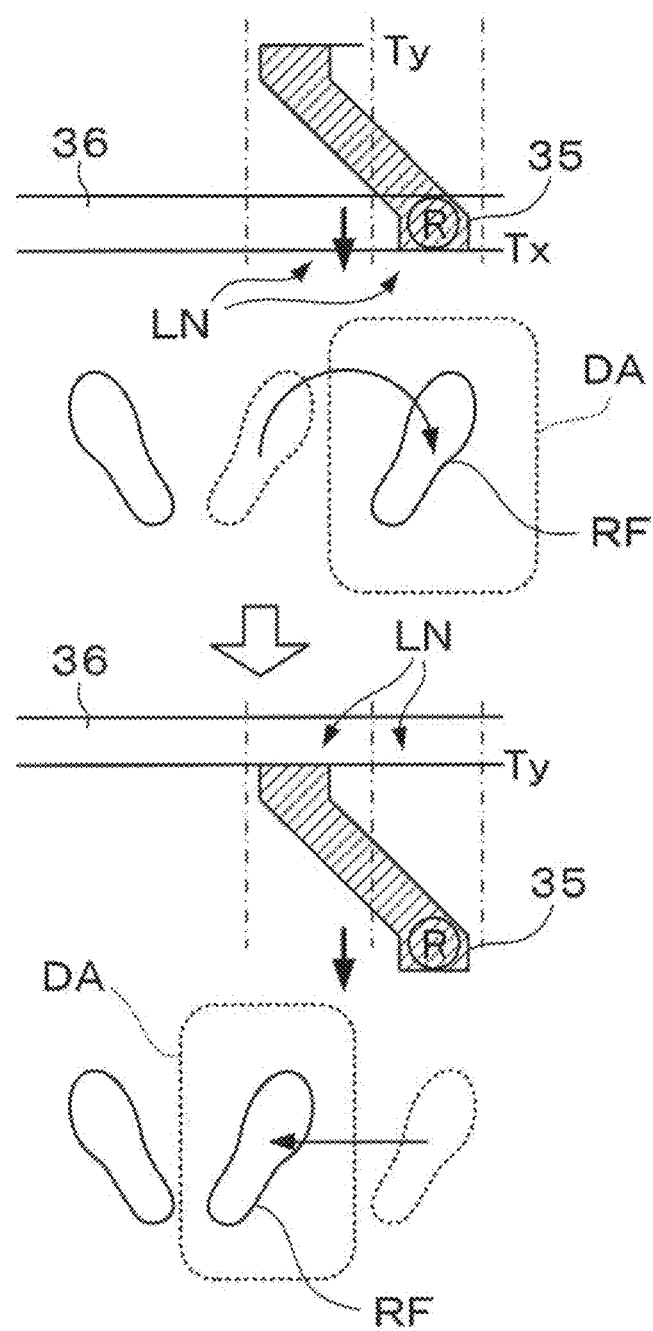
FIG. 10 is a figure showing an example of a correspondence relationship between a command mark corresponding to a slide and the step that the player should perform.

The command marks 35 change in length and in shape according to the type of step that they describe in the step record RS of the sequence data SD. For example, the command marks 35A, 35B correspond to long steps, whereas the command marks 35C, 35D correspond to slides. In the following, the relationship between the command marks 35 and the types of steps will be explained with reference to FIGS. 8 through 10. FIGS. 8 through 10 show examples in which steps by the right foot of the player are commanded for a determination region DA of either play region AR, among the front and rear play regions AR. FIG. 8 shows an example of a correspondence relationship between a command mark 35 corresponding to a short step and the step that the player PL should perform. In this case, as indicated by the semicircular arrow sign, at the time point Tx that the command mark 35 overlaps the reference mark 36, the player PL should step down with his/her right foot RF upon the determination region DA corresponding to the lane LN that the command mark 35 is displaying.

FIG. 9 shows an example of a correspondence relationship between a command mark 35 corresponding to a long step and the step that the player PL should perform. The command mark 35 that corresponds to a long step has a length that is longer than that of the reference mark 36, and has a length that corresponds to the length of the time duration from the time point Tx that the step should start until the time point Ty that the step should be ended. In this case, as indicated by the semicircular arrow sign, at the time point Tx that the command mark 35 overlaps the reference mark 36, the player PL should step down with his/her right foot RF upon the determination region DA corresponding to the lane LN that the command mark 35 is displaying, and subsequently must continue stepping with his/her right foot RF upon that determination region DA until the time point Ty at which the command mark 35 passes the reference mark 36.

FIG. 10 shows an example of a correspondence relationship between a command mark 35 corresponding to a slide and the step that the player PL should perform. The command mark 35 corresponding to the slide has a length that is longer than that of the reference mark 36, and has a length that corresponds to the length of the time duration from the time point Tx that the step should start until the time point Ty that the step should be ended. Furthermore, the command mark 35 corresponding to the slide is displayed so as to move gradually from the lane LN corresponding to the determination region DA where the slide should be started to the determination region DA where the slide should be ended. In response to a command of this type, as shown by the semicircular arrow sign, at the time point Tx that the command mark 35 overlaps the reference mark 36, the player PL should step down with his/her right foot RF upon the determination region DA corresponding to the lane LN displayed by the command mark 35, and subsequently, in accordance with change of the determination region DA, must make his/her right foot slide over the treading surface 11a as shown by the straight arrow sign, and, along with completing shifting of the right foot RF to the final determination region DA by the time point Ty in which the command mark 35 passes the reference mark 36.

As described above, the time point that the player PL should perform the step, the length of the time duration that the step should be continued, the determination region DA in which the step should be performed, and the foot with which the step should be performed are commanded by employing the position of the command mark 35 in the guidance image 31 in the vertical direction and in the transverse direction, and visual factors such as the color and the pattern and so on of the command mark 35 and letters or the like displayed in the identification portion 35a. The dance command unit 25 of FIG. 4 reads in those records, among the records described in the sequence data SD, that specify time points in a range of a predetermined time duration from the present time point into the future (as one example, a time duration corresponding to two bars of the musical piece); determines the position, the display mode, the letters in the identification portion, and so on of the command marks 35 according to the information described in those records; and displays the command marks 35 in the guidance image 31 according to these details that have thus been determined. Therefore, the dance command unit 25 serves as an example of a step command device.

According to the structure described above, it is possible to specify and to select, in the step record RS, at least one of the determination regions DA11 through DA14 and DA21 through DA24 as the determination region DA where the step should be performed. Accordingly, it is possible to command steps of various types for each of the front and rear play regions AR1, AR2 while distinguishing between the play regions AR1, AR2. For example, it is possible to command the players PL1, PL2 who are arranged longitudinally to perform the same step, or mutually different steps, while they are cooperating or collaborating with one another. Due to this, it is possible to guide the players PL so that they can perform complex and highly expressive steps. For example, it is possible to guide the players PL so as to show dance-specific performances, such as movements in which the front and rear players PL1, PL2 move so as to change their positions alternatingly between left and right, or movements taking steps in which the front and rear players PL are mutually correlated so that, for example, the player PL2 at the rear moves left and right and performs steps taking the player PL1 at the front as an axis. Accordingly, it is possible to enhance the interest of the dance game.

Incidentally, as will be clear from FIGS. 6 and 7, since the lanes LN are shared by the front and rear play regions AR1, AR2, accordingly sometimes it may happen that at least some of the command marks 35 for each of the play regions AR are overlapped upon the same lane LN. Moreover, since a command mark 35 that commands a slide is displayed so as to cross diagonally between several lanes LN, accordingly sometimes it may also happen that it is overlapped with other command marks 35. In an overlapped portion of this type, the command marks 35 are displayed in a mixed manner so that the players PL are able to recognize each of the command marks 35. In the example of FIGS. 6 and 7, the command marks 35B, 35C are overlapped on the lane LN2 from its lower end portion to its middle, and moreover the command mark 35D extends from the rightmost lane LN4 to the leftmost lane LN1 so as to cross the overlapped portions of those command marks 35B, 35C. In each of these overlapped portions, the display of the command marks 35 is controlled so that the visual elements of each command mark 35, such as its unique color, pattern, and so on, appear alternatingly in various ways, such as in the form of zigzags, stripes, lattices, and so on.

In the above description, a case has been explained in which dance steps have been commanded, but, with this game machine 3, it would also be possible to command the player PL via the guidance image 31 to perform actions of various types that constitute a dance, other than actions of making steps. For example, the player PL may be commanded to perform a jump upward from the treading surface 11a. When a jump is commanded, the information in the step record RS specifying the foot with which the player should take a step and the information specifying the determination region DA may be empty information items having no values. It is possible to distinguish whether or not the player PL has jumped from the output signals of the light reception portions 14c of the stage sensor 14. In other words if, from the state in which the foot of the player PL is being detected at some position in the play region AR that is specified for the jump, a change of all of the light reception portions 14c to the ON signal state is detected, in other words if that foot is not detected, then it may be considered that the player PL has jumped. Furthermore, via the guidance image 31, it would also be possible to command the player PL to perform some action other than the action of moving his/her foot, for example to perform a crouching action or a squatting movement. It is possible to determine whether or not an operation of this type has been performed on the basis of the video from the camera 17, for example.

Figure 11:
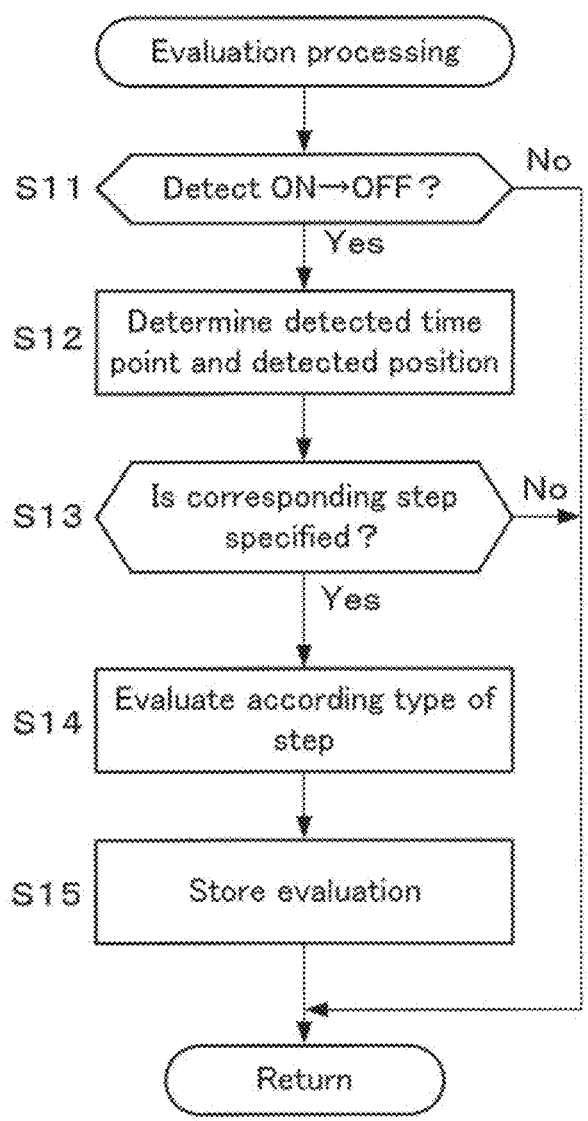
FIG. 11 is a flow chart showing an example of evaluation processing executed by a dance evaluation unit.

Next, an example of the evaluation processing that is performed by the dance evaluation unit 26 in order to evaluate a player PL will be explained with reference to FIG. 11. The processing of FIG. 11 is repeatedly executed on a predetermined cycle, and, by executing this evaluation processing, the dance evaluation unit 26 functions as an example of an evaluation device. When the processing of FIG. 11 starts, the dance evaluation unit 26 determines whether or not a change of the output signal of any of the light reception portions 14c of the stage sensor 14 from ON to OFF has been detected (step S11). This determination is for determining whether or not the player PL newly steps on any one of positions on the treading surface 11a. If no change of the output signals of the light reception portions 14c is detected, then the dance evaluation unit 26 terminates this iteration of the evaluation processing. On the other hand, when change of the output signals from the light reception portions 14c is detected, the dance evaluation unit 26 determines the time point of detection and the position of detection with respect to the change (step S12). In this case, the determination of the position of detection may be performed by determining the determination region DA corresponding to the light reception portion or portions 14c that have detected change from ON to OFF. The determination region DA that has been detected in this manner is the actual step position where the player PL is treading.

Next, the dance evaluation unit 26 determines whether or not a step corresponding to the time point and the actual step position determined in step S12 is specified in the sequence data SD (step S13). In this case, the dance evaluation unit 26 may determine whether or not a time point within a predetermined evaluation range with respect to the time point that has been detected is specified in the sequence data SD, and moreover whether or not a step record RS in which the same determination region DA as the actual step position is included therein. If an affirmative decision is reached in step S13, then the dance evaluation unit 26 evaluates the step by the player PL according to the type of step designated by the step record RS (step S14). The evaluation in step S14 is performed separately for each of the play regions AR.

Evaluation according to the type of step may, for example, be performed as follows. If a short step is specified in the step record RS, then it is determined that the short step has succeeded if the amount of deviation between the time point of detection determined in step S12 and the time point specified in the step record RS is within a predetermined permitted range. It would also be possible to evaluate the step higher, the smaller is the amount of deviation. In the case of a short step, if the output signal from the light reception portion 14c corresponding to the specified determination region DA has changed from ON to OFF within the permitted range for the time point that was specified, then that will suffice for it to be determined that the step that was specified has been performed. If a change of this sort is detected, then, even if an OFF signal is outputted continuously after the command mark 35 that commands the short step has passed the reference mark 36, still this may be processed as not exerting any influence upon the evaluation. If an event where the foot should be taken off temporarily from the treading surface 11a after the short step has been performed is incorporated into elements of the evaluation, processing, which is an example, may be performed so as to determine whether or not the treading surface 11a has been tread on at the same determination region DA continuously still after exceeding the permitted range, based on the output signal of the stage sensor 14, and if it is judged as being continued, the processing may further be performed so as to determine as being a failure or to lower the evaluation.

If a long step is specified in the step record RS, the output signals from the light reception portions 14c of the stage sensor 14 are continuously monitored, it is determined whether or not the player PL steps upon the same determination region DA of the treading surface 11a continuously to a time point within the permitted range with respect to the end time point of the long step specified in the step record RS, and, if it can be confirmed that he/she has stepped continuously, then it is determined that the long step has succeeded. It would also be possible for the step to be evaluated to be higher, the smaller are the amounts of deviation of the start time point and the end time point of the step. But if the player PL has raised his/her foot or the like before the time point reaches the permitted range with respect to the end time point and the output signals from all of the light reception portions 14c of the same determination region DA have changed to ON, then it is determined that the long step has failed. As for the long step, it is sufficient to evaluate whether or not the output signal of the light reception portion 14c corresponding to the specified determination region DA changes from ON to OFF with the long step being started at a time point within the permitted range corresponding to the specified time point, and then, evaluate whether or not the step has been continued throughout a predetermined time period with making the OFF signal be outputted continuously to a time point within the permitted range corresponding to the specified end time point. Accordingly, the processing may be performed in such a manner that the evaluation does not affected, even if the OFF signal is outputted continuously after the command mark 35 that commands the long step has passed the reference mark 36. In other words, the evaluation may be performed so as to disregard that the determination region DA to which the long step has been specified has been stepped on continuously after the end time point. If an event where the foot should be taken off temporarily from the treading surface 11a after the long step has been performed is incorporated into the elements of the evaluation, the processing, which is an example, may be performed so as to determine whether or not the treading surface 11a is tread on at the same determination region DA continuously still after exceeding the permitted range corresponding to a time at which the long step should be terminated, based on the output signal of the stage sensor 14, and if it is judged as being continued, the processing may further be performed so as to determine as being a failure or to lower the evaluation.

If a slide is specified in the step record RS, then the output signals of the light reception portions 14c of the stage sensor 14 are monitored continuously, and it is determined whether or not the player PL continues to step upon the treading surface 11a until a time point within the permitted range with respect to the end time point of the slide specified in the step record RS, and moreover it is determined whether or not the determination region DA has changed from the determination region DA at the start of the slide to the determination region DA at the end of the slide. It is determined that the slide has succeeded if it has been possible to confirm those actions. It is also possible to evaluate the step as being higher (i.e. better), the smaller are the amounts of deviation of both the start time point of the slide and its end time point. And it is determined that the slide has failed if the player PL raises his/her foot or the like before arriving at a time point within the permitted range with respect to the end time point so that the output signals from the light reception portions 14c of the determination region DA that is designated as being the subject of the slide all have changed to ON. Furthermore, it is determined that the slide has failed if it has not been possible to confirm change of the detected position from the determination region DA at the start of the slide to the determination region DA at the end of the slide. As for the slide, it is sufficient to evaluate whether or not the output signal of the light reception portion 14c corresponding to the specified determination region DA changes from ON to OFF with the step being started at a time point within the permitted range corresponding to the specified time point, and then, evaluate whether or not the change of the detection position of the OFF signal, that indicates the slide from the determination range DA on which the step should be started to the determination range DA on which the step should be terminated, has been detected at a time point within the permitted range corresponding to the specified end time point. Accordingly, the processing may be performed in such a manner that the evaluation does not affected, even if the OFF signal is outputted continuously after the command mark 35 that commands the slide has passed the reference mark 36. In other words, the evaluation may be performed so as to disregard that the determination region DA on which the slide should be terminated has been stepped on continuously after the end time point. If an event where the foot should be taken off temporarily from the treading surface 11a after the slide has been performed is incorporated into the elements of the evaluation, the processing, which is an example, may be performed so as to determine whether or not the treading surface 11a is tread on the determination region DA at which the slide should be terminated continuously still after exceeding the permitted range corresponding to a time at which the slide should be terminated, based on the output signal of the stage sensor 14, and if it is judged as being continued, the processing may further be performed so as to determine as being a failure or to lower the evaluation.

After the stepping by the player PL has been evaluated in step S14, the dance evaluation unit 26 stores the result of evaluation in step S14 in the internal memory of the control unit 20, or in the storage device 21 (step S15), and then this iteration of the evaluation processing is terminated. But if in step S13 it has been determined that there is no command for a corresponding step, then the dance evaluation unit 26 skips steps S14 and S15 and this iteration of the evaluation processing is terminated. In other words, if any step other than the designated step is performed, then that step is not evaluated by the evaluation processing of FIG. 11. Accordingly, even if the player PL steps upon the treading surface 11a in a position that is different from the determination region DA commanded by the command mark 35, this action is ignored by the dance evaluation unit 26 and does not exert any influence upon the evaluation.

In the processing of FIG. 11, the processing of step S12 and subsequently is executed upon the condition that the output signal of any one of the light reception portions 14c of the stage sensor 14 has changed from ON to OFF. Accordingly, in response to a command for a step via the guidance image 31, it is necessary for the player PL to raise his/her foot once from the treading surface 11a, and then newly step down the determination region DA designated by the command mark 35. However, the evaluation processing by the dance evaluation unit 26 is not limited to this example of evaluating the step when triggered by a change of the output signals of the light reception portions 14c from ON to OFF. For example, it would also be possible to determine, based on the step records RS in the sequence data SD, whether or not the step is performed properly through the determination as to whether or not the step of the player PL is detected at the specified time point and on the specified determination region DA. In this case, the step may be determined as being properly when the player PL makes his/her foot slide to the designated determination region DA on the treading surface 11a without raising the foot once therefrom, in addition to the case where the player PL raise his/her foot once, and then newly step down the designated determination region DA. And, if a jump is specified as a type of step, then it will be possible to perform determination by matching whether on not the output signals from all of the light reception portions 14c in the play region AR that is specified for this jump have become ON, to the time point that the jump is specified. The dance evaluation unit 26 may determine whether or not the player PL has performed actions such as a crouching action as instructed other than the steps of the player PL through the usage such as video to be captured by the camera 17 or the like.

Incidentally, in the processing of FIG. 11, no determination is made as to with which of his/her left foot and right foot the player PL is stepping upon the determination region DA. In other words, even though the foot with which stepping should be performed is specified in the guidance image 31, whether or not the player PL has stepped with that foot that has been specified is outside the subjects for evaluation. Accordingly, for example, even if the player PL has stepped down with his left foot upon a command mark 35 for which the right foot was designated, if the time point of that step and its position match the command in the step record RS, then this step by the player PL is evaluated to have been appropriate. However, it would also be possible to detect whether the step has been performed with the left foot or the right foot, and to add to the subjects of evaluation whether or not the step has been performed with the foot on the side specified in the command. If the resolving power of the stage sensor 14 is sufficiently high, it is possible to distinguish between the right foot and the left foot on the basis of the pattern in which the stage sensor 14 is detecting a foot, in other words on the basis of what is the distribution of the light reception portions 14c that are outputting ON signals and the light reception portions 14c that are outputting OFF signals. Alternatively, it would also be possible to determine the orientation of at least a part of the body of the player PL (for example, the orientation of his/her lower body half or of his/her face) on the basis of the video of the player PL photographed by the camera 17, and to distinguish between his/her left foot and his/her right foot on the basis of the result of that determination. And it would be possible to distinguish between his/her left foot and his/her right foot by combining his/her orientation determined by the video from the camera 17 and the status of detection by the stage sensor 14. Of course, other than employing the stage sensor 14 or the camera 17, it would also be possible to employ a sensor of some type that is capable of distinguishing between the left foot of the player and his/her right foot.

Furthermore, in the processing of FIG. 11, even when two players PL1, PL2 are playing, it is not determined which of the players PL has performed a step. Accordingly, even if the player PL on the front side steps on one of the determination regions DA21 through DA24 on the rear side or if conversely the player PL2 on the rear side steps on one of the determination regions DA11 through DA14 on the front side, if the time point and the position of this step match, then it is determined that stepping has been performed in an appropriate manner. Accordingly, it is also possible for two players PL1, PL2 to play at dancing while helping one another. Alternatively, a single player PL may be permitted to play so as to cover both of the front and rear play regions AR1, AR2. Yet further, by allowing a sufficient clearance on the treading surface 11a of the stage 11, it is possible to permit a plurality of players PL to perform steps of a dance in at least one of the play regions AR.

As is clear from the above explanation, the play regions AR are regions that are set as ranges in which at least one player PL is to perform steps of a dance. It is possible logically to determine which range is set as one play region by comparing the width of the play region with the command for the step given via the display device 13. In other words since, in the embodiment described above, steps are commanded by taking the four determination regions DA11 through DA14 on the front side as one unit, and steps are commanded by taking the four determination regions DA21 through DA24 on the rear side as another unit, accordingly it is possible to consider the play regions AR each as a unit for those commands. And those play regions AR may be set so that their positions deviate with respect to the longitudinal direction. In the embodiment described above a plurality of determination regions DA are set in the transverse direction for one play region AR by varying their transverse positions, but it is possible to guide the player PL to perform steps forward and backward in a single play region AR by setting a plurality of determination regions DA in the longitudinal direction within that single play region AR, and by varying the step position commands in the longitudinal direction as appropriate. In this case, the player PL can be directed to perform steps forward, backward, leftward, and rightward within the play regions AR that are displaced forward and backward, so that it is possible to guide the player PL so as to provide a dance having higher performability. The number of determination regions DA in the transverse direction is not limited to being four; it may be varied as appropriate. Moreover, it is also possible to vary the number of play regions AR in the longitudinal direction as appropriate.

In the embodiment described above, a plurality of determination regions AD were fixedly set in each of the play regions AR1, AR2, but, it would also be possible to set the determination regions AD so that they can change dynamically. For example, the arrangement of the determination regions DA may change as appropriate while the game is being played. Furthermore, the sizes of the determination regions DA may also change in an appropriate manner. For example, it could be arranged for the sizes of the determination regions DA to change according to the degree of difficulty that is set for the game, or according to the level of the player PL, his/her skill, or the like. As one example, the higher is the degree of difficulty, the level of the player PL or the like, by narrowing down the determination regions DA, it may be arranged to perform the evaluation related to the suitability of the positions where the player PL makes his steps more stringently. In that case, the widths of the command marks 35 in the transverse direction may be changed according to change of the size of the determination regions DA in the transverse direction. Furthermore, it is not necessarily required to set the lanes LN in which the command marks 35 move to be fixed. For example it is possible to change the range in the transverse direction of the determination regions DA dynamically by taking the positions of the command marks 35 in the transverse direction as reference by, along with omitting the setting of the lanes LN and specifying in the sequence data SD the positions in the transverse direction where the command marks 35 are to be displayed in association with the positions in the transverse direction of the light reception portions 14c, also specifying what type of ranges in the transverse direction of the light reception portions 14c are to be set as determination regions DA by taking their commanded positions as reference. If a plurality of determination regions DA are set in each of the play regions AR in the longitudinal direction, and the player PL is commanded to take steps in the longitudinal direction, then the determination regions DA may also be changed dynamically in the longitudinal direction.

The present invention is not limited to the embodiment described above; it may be varied or changed as appropriate. For example, in the embodiment described above it was arranged to evaluate steps separately for each of the play regions AR1, AR2, but it would also be possible not to distinguish the play regions AR1, AR2, but to determine whether the determination region DA that is designated and the determination region DA in which the step is actually detected match or do not match, only in relation to the transverse direction. For example if, in a case in which a step is commanded for the left edge determination region DA11 of the play region AR1 at the front, a step has been detected in the left edge determination region DA21 of the play region AR2 at the rear, then this may be considered as being a case in which the commanded step position and the actual step position agree with one another. In conclusion, provided that steps are commanded for each of the play regions AR so that the step position changes in an appropriate manner for each of the front and rear play regions AR1, AR2, it is possible to guide the plurality of players PL at the front and rear so that they execute complex and highly expressive steps while they cooperate or collaborate together, and thereby it is possible to enhance the interest of the game.

While the dance command unit 25 serves as one example of a step command device, and commands the time points and the positions of steps and so on by relatively shifting the command marks 35 and the reference mark 36 in predetermined directions within the guidance image 31, the step command device is not limited to this type of example. For example, the step command device may be built so as to present an image in which a predetermined character is dancing as a guidance image, so that the player performs dance steps according to this image. Moreover, in the embodiment described above, the shifting region 37 of the guidance image 31 was shared between the front and rear play regions AR1, AR2, but it would also be possible to provide a structure in which, by displaying images commanding steps or the like for each play region in mutually different areas upon the display device, the step command device commands steps or the like while distinguishing between the play regions.

In the embodiment described above, while the dance evaluation unit 26 is provided in the control unit 20 of the game machine 3 in order to evaluate the player PL, instead of, or in addition to this, an arrangement may be provided to make users of the game system 1 evaluate the player PL using dance video to be distributed via the network 5. That is, the dance evaluation unit 26 is not necessarily required in the game machine 3. It is also acceptable to omit a step detection device such as the stage sensor 14 when evaluating the player PL through the distribution of the dance video. In the case that the step detection device is provided in the game machine 3, not only the stage sensor 14 using infrared rays but also sensors of various types may be employed as the step detection device as long as the actual step position of the player PL can be detected. For example, it may be arranged to detect his/her actual step position via the camera 17. Alternatively, it may be arranged to detect the position where the player is treading by disposing load sensors or the like upon the treading surface 11a.

In the embodiment described above, as one example of an evaluation device, the dance evaluation unit 26 evaluates the player PL by comparing together the time points and the positions (i.e. the determination regions DA) of steps commanded by the dance command unit 25 and the time points and the positions of the actual steps detected by the stage sensor 14; but various changes would be possible as appropriate, provided that the evaluation device can evaluate the player PL on the basis of comparison between the status of the steps that are commanded and the detected statuses of the steps that are actually performed. For example, the evaluation device may be adapted to compare together the time points of the steps that are commanded and the time points of the steps that are actually detected, and to evaluate the player PL irrespective of whether or not their positions agree with one another. As described above, the evaluation device can be omitted in the game machine 3 as appropriate.

Figure 12:
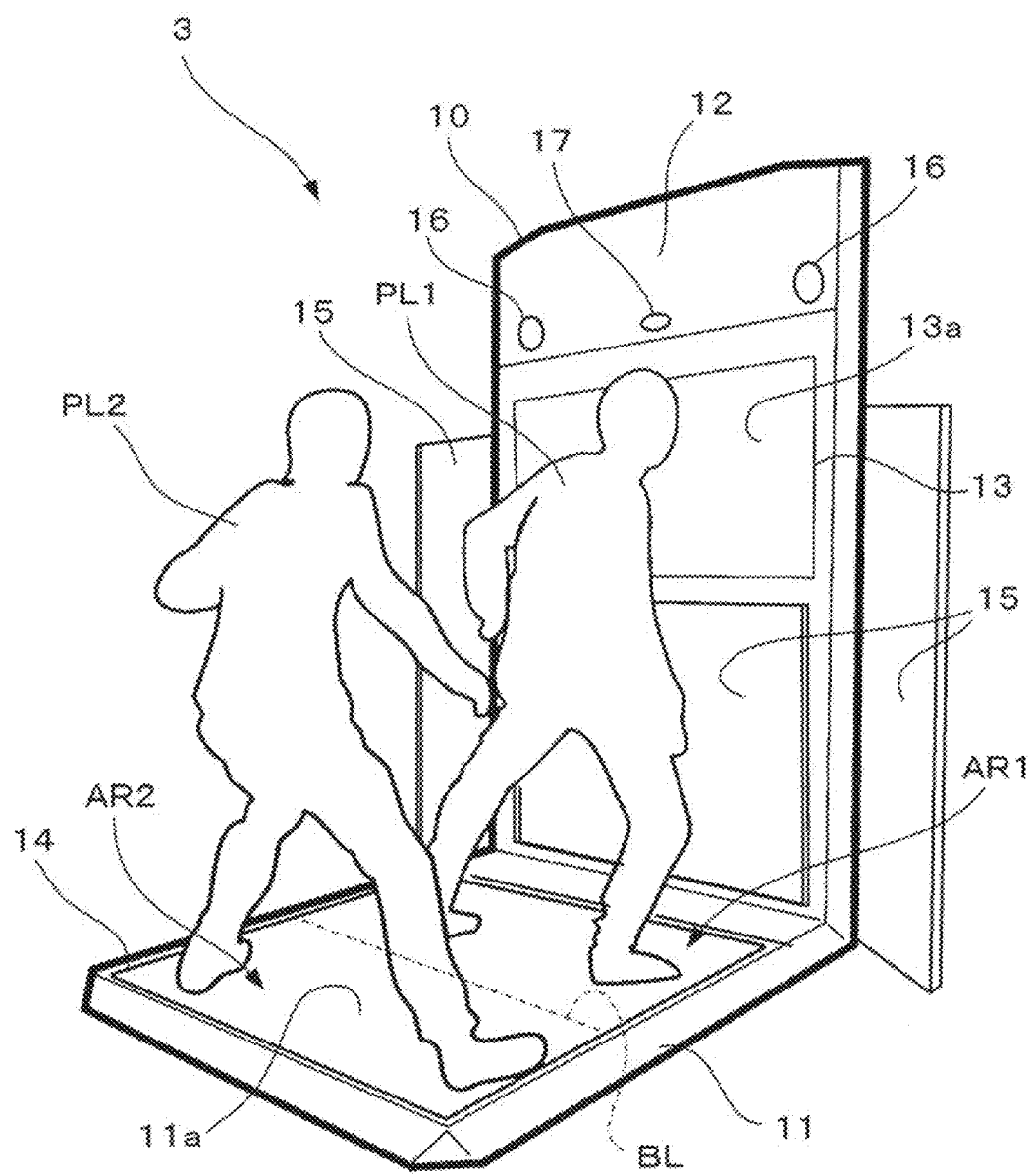
FIG. 12 is a figure showing a modification of a game machine.
Figure 13:
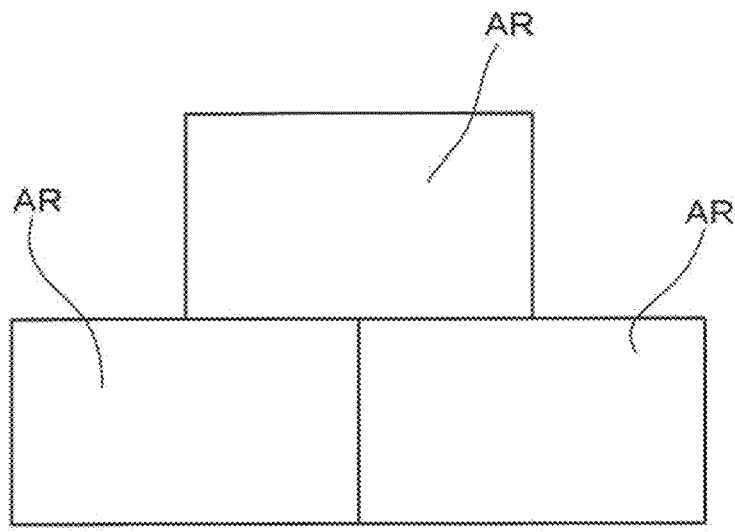
FIG. 13 is a figure showing a modification with respect to an arrangement of play regions on the treading surface.
Figure 14:
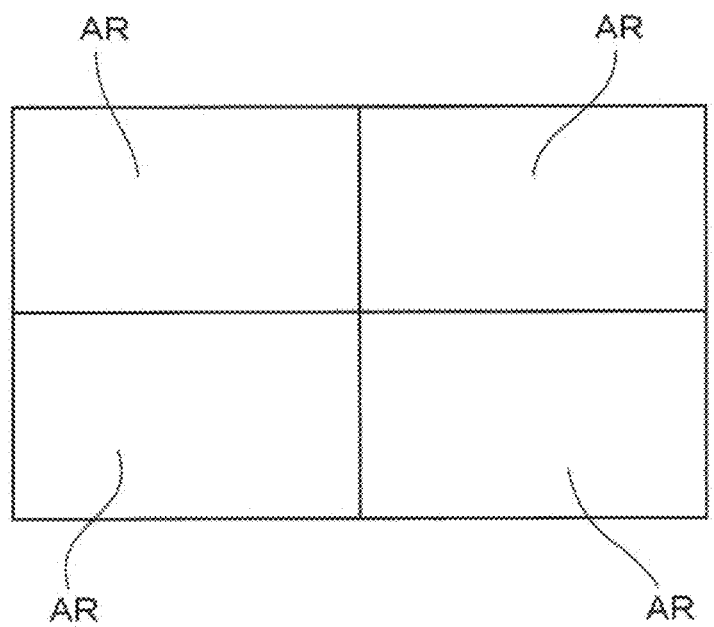
FIG. 14 is a figure showing another modification with respect to an arrangement of play regions on the treading surface.
Figure 15:
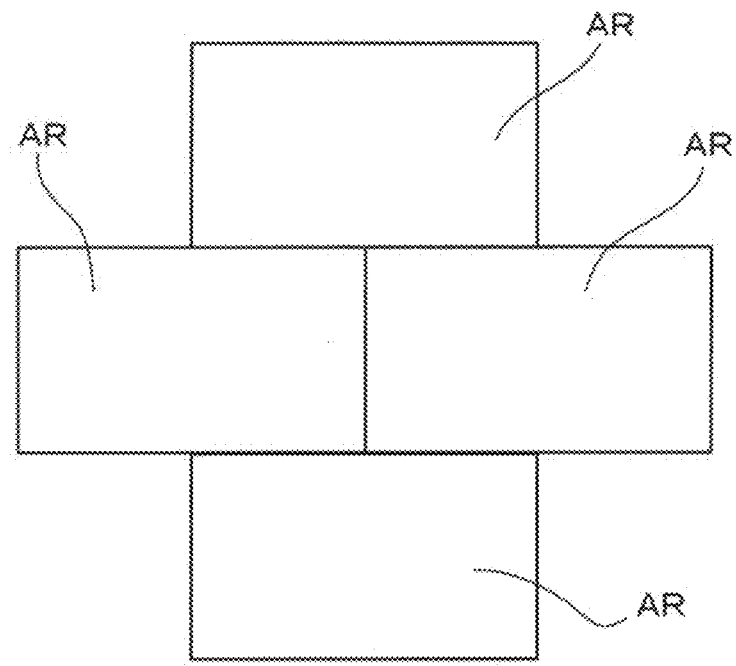
FIG. 15 is a figure showing still another modification with respect to an arrangement of play regions on the treading surface.
Figure 16:
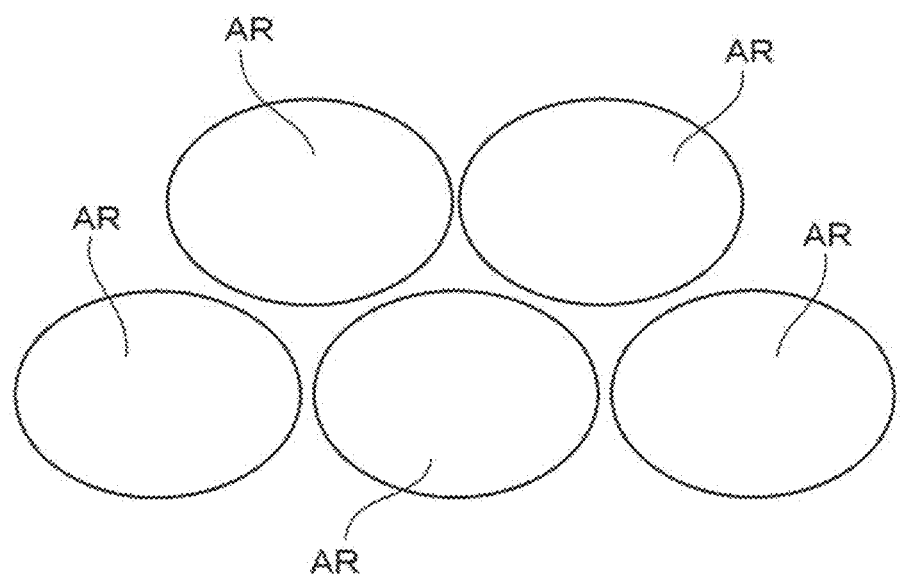
FIG. 16 is a figure showing a modification with respect to a figure and an arrangement of play regions on a treading surface of a stage.

The mirror 15 of the game machine 3 is not limited to an example arranged below the display device 13. For example, as shown in FIG. 12, mirrors 15 may be provided along the left and right sides of the standing wall 12 of the casing 10. In this case, the mirror 15 below the display device 13 may be omitted. The stage 11 is not limited to a configuration in which two play areas AR are arranged on the front and rear sides, and the arrangement of the play areas AR can be varied as appropriate as long as a plurality of play areas AR are arranged so as to be displaced in the front and rear direction. For example, it is possible to make modifications such that a plurality of play areas AR are arranged to form a triangular shape as viewed from above (FIG. 13), arranged to form a square shape (FIG. 14), arranged to form a rhombus shape (FIG. 15), or arranged to form a staggered pattern (FIG. 16). As is clear from the example of FIG. 16, the play area AR is not limited to an example in which the play area AR is set in a rectangular shape, and may be set in an appropriate shape such as an ellipse. Part of the front and rear play regions AR may overlap each other. The mirror 15 is not limited to a physical mirror that reflects the optical image of the player PL. For example, an electronic mirror that displays an image of the player PL taken by the camera 17 as an electronic reflection image on the screen of the display device may be provided. The display device in that case may be provided, for example, at the position of the mirror 15 in FIG. 2 or FIG. 12, or may be provided by using a part of the display device 13 in FIG. 2 or FIG. 12.

In the following, various aspects of the present invention are explained that are deduced from the embodiments and variant embodiments described above. Incidentally, in order to facilitate understanding of the present invention, reference symbols in parentheses that refer to the attached figures are appended in the following explanation, but the present invention is not thereby to be considered as being limited to the embodiments shown in the figures.

In one aspect according to the present invention, there is provided a game machine (3) which is provided with: a stage (11) having a treading surface (11a) on which a plurality of play regions (AR1, AR2) are set so as to be displaced from each other in a front and rear direction that is a direction facing a display device (13), and each are set as a range where at least one player (PL) should perform steps of a dance; and a step command device (25) which commands the player step positions at which the player should tread in each of the play regions, with the step positions being changed in association with progress of a game, and being commanded through the display device in a distinguished manner for each of the play regions.

According to the game machine of the above aspect, the commands are issued to the player to make the player perform steps suitable for each play region in each of the play regions. Since the play regions are set so as to be displaced from each other in the front and rear direction, it is possible to guide the player so that he/she can take the steps with a complex and high performance by making the players be positioned in the displacing manner in the front and rear direction, and by coordinating the commands for each of the play regions to make the players take the cooperating or collaborating steps. Therefore, it is possible to enhance the interest of the game form the view point of performing dance to others.

In the game machine according to the above described aspect, a mirror (15) maybe provided so as to face the player. According to this, the player who is positioned on the front side play region can visually recognize the state of the player on the rear side play region by using the mirror. For example, it is possible to recognize what type of the steps that player is preforming. Therefore, it is possible to provide the game machine with a configuration suitable for making the players on the front and rear sides show the dance in a cooperated or collaborated manner. For example, it is possible to easily perform the action in which the player on the front side takes an ad-lib action in accordance with the movement of the player on the rear side.

Further, the mirror may be arranged below the display device. According to this, the player who is facing the display device can visually and easily recognize at least the feet of the player behind.

In the game machine according to the above described aspect, at least two play regions may be arranged in the front and rear direction with respect to the display device. According to this, when taking the state that the players are lined up in the front and rear direction as a criteria, it is possible to guide the players to show performance such that the players take the steps synchronously or alternately in the left and right direction.

The game machine according to the above described aspect may further be provided with a dance video acquisition device (17) that acquires dance video images in which the player on the treading surface is photographed. According to this, it is possible to provide an opportunity to show dance steps to others through the dance video images, to thereby further enhance the interest of the game.

In the game machine provided with the dance video acquisition device, there may further be provided with a video transmission device (27) capable of transmitting the dance video images through a predetermined network (5). According to this, it is possible to allow many viewers to view the dance video images via the network, and it is possible to further enhance the interest of the game. It is also possible to distribute dance video images via the network, evaluate the dance using the feedback thereto, or activate communication between users, to thereby further enhance the interest of the game by utilizing the network.

In the game machine according to the above described aspect, there may further be provided with a step detection device (14) which outputs a signal corresponding to an actual step position at which the player actually tread upon the treading surface in each of the play regions, and an evaluation device (26) which evaluates the player based on comparison between a pattern in which the step positions are commanded by the step command device and a pattern in which the actual step positions are detected by the step detection device. According to this, it is possible to give the player the motivation to play the game in order to obtain a high evaluation on the game machine through the evaluation as to how the player is taking the step in response to the command of the step.

The invention claimed is:

1. A game machine comprising:
a stage having a treading surface on which a plurality of play regions are set so as to be displaced from each other in a front and rear direction that is a direction facing a display device, each play region being set as a range where at least one player should perform steps of a dance, and each play region being dedicated to a corresponding one of a plurality of players; and
a step command device which commands the player step positions at which the player should tread in each of the play regions, with the step positions being changed in association with progress of a game, and being commanded through the display device in a distinguished manner for the corresponding one of the plurality of players for each of the play regions.

2. The game machine according to claim 1, wherein a mirror is provided so as to face the player.

3. The game machine according to claim 2, wherein the mirror is arranged below the display device.

4. The game machine according to claim 1, wherein at least two play regions are arranged in the front and rear direction with respect to the display device.

5. The game machine according to claim 1, further comprising a dance video acquisition device that acquires dance video images in which the player on the treading surface is photographed.

6. The game machine according to claim 5, further comprising a video transmission device capable of transmitting the dance video images through a predetermined network.

7. The game machine according to claim 1, further comprising:
a step detection device which outputs a signal corresponding to an actual step position at which the player actually tread upon the treading surface in each of the play regions; and
an evaluation device which evaluates the player based on comparison between a pattern in which the step positions are commanded by the step command device and a pattern in which the actual step positions are detected by the step detection device.

* * * * *